United States Patent
Bosch et al.

(10) Patent No.: US 12,468,855 B2
(45) Date of Patent: Nov. 11, 2025

(54) DETECTING BROKEN OBJECT LEVEL AND FUNCTION LEVEL AUTHORIZATION ISSUES WITH API SERVICES

(71) Applicant: Cisco Technology, Inc., San Jose, CA (US)

(72) Inventors: Hendrikus G.P. Bosch, Aalsmeer (NL); Alessandro Duminuco, Milan (IT); Sape Jurriën Mullender, Amsterdam (NL); Julien Barbot, Villebon-sur-Yvette (FR); Ariel Shuper, Kfar-Haroe (IL)

(73) Assignee: Cisco Technology, Inc., San Jose, CA (US)

( * ) Notice: Subject to any disclaimer, the term of this patent is extended or adjusted under 35 U.S.C. 154(b) by 257 days.

(21) Appl. No.: 17/843,355

(22) Filed: Jun. 17, 2022

(65) Prior Publication Data
US 2023/0229811 A1    Jul. 20, 2023

Related U.S. Application Data

(60) Provisional application No. 63/300,359, filed on Jan. 18, 2022.

(51) Int. Cl.
*G06F 21/62*    (2013.01)
*G06F 9/54*    (2006.01)

(52) U.S. Cl.
CPC ............ *G06F 21/629* (2013.01); *G06F 9/547* (2013.01)

(58) Field of Classification Search
CPC ......... G06F 21/629; G06F 9/547; G06F 9/546
See application file for complete search history.

(56) References Cited

U.S. PATENT DOCUMENTS

| | | | |
|---|---|---|---|
| 9,648,040 B1 | 5/2017 | Morkel et al. |
| 9,729,506 B2 | 8/2017 | Call et al. |
| 11,108,803 B2 | 8/2021 | Wilton et al. |
| 11,245,728 B1 | 2/2022 | Curtis et al. |
| 11,258,824 B1 | 2/2022 | Hinrichs et al. |

(Continued)

OTHER PUBLICATIONS

Li et al., "IoT-APIScanner: Detecting API Unauthorized Access Vulnerabilities of IoT Platform", Aug. 2020, 29th International Conference on Computer Communications and Networks, pp. 1-5 (Year: 2020).*

(Continued)

*Primary Examiner* — Kenneth W Chang
(74) *Attorney, Agent, or Firm* — Lee & Hayes, P.C.; James M. Behmke (57) ABSTRACT

In one embodiment, an illustrative method may comprise: monitoring, by a process, a behavior of an application between one or more client devices and an application programming interface service; establishing, by the process, an application model of objects and functions within the application based on the behavior; and determining, by the process, an authorization logic of the application for the objects and functions based on the application model. In one embodiment, the illustrative method further comprises: testing one or more authorization approaches against the application to determine one or more discrepancies within the authorization logic indicative of faulty authorizations; and mitigating the one or more discrepancies.

15 Claims, 5 Drawing Sheets

(56) References Cited

U.S. PATENT DOCUMENTS

| | | | | |
|---|---|---|---|---|
| 2007/0266148 | A1* | 11/2007 | Ruiz | H04L 43/50 709/224 |
| 2009/0254926 | A1* | 10/2009 | Kim | H04L 67/02 719/328 |
| 2012/0159570 | A1 | 6/2012 | Reierson et al. | |
| 2014/0245376 | A1* | 8/2014 | Hibbert | G06F 21/577 726/1 |
| 2015/0128156 | A1* | 5/2015 | Zhu | G06N 5/045 719/328 |
| 2016/0301584 | A1* | 10/2016 | Gehl | H04L 43/0876 |
| 2016/0359878 | A1* | 12/2016 | Prasad | H04L 43/02 |
| 2016/0373455 | A1* | 12/2016 | Shokhrin | G06F 21/629 |
| 2017/0244709 | A1* | 8/2017 | Jhingran | G06F 21/44 |
| 2017/0272462 | A1* | 9/2017 | Kraemer | G06F 21/52 |
| 2018/0189130 | A1* | 7/2018 | Mowry | G06F 11/0784 |
| 2018/0255089 | A1 | 9/2018 | Wilton et al. | |
| 2019/0079734 | A1* | 3/2019 | Kadam | G06F 8/71 |
| 2021/0149788 | A1* | 5/2021 | Downie | G06F 11/3604 |
| 2021/0234769 | A1* | 7/2021 | Ganapathi | H04L 43/062 |

OTHER PUBLICATIONS

"What is API Security?", online: https://owasp.org/www-project-api-security/, 2019, accessed May 17, 2022, 4 pages, OWASP.

"Authentication and Authorization", online: https://swagger.io/docs/specification/authentication/, accessed May 17, 2022, 5 pages, Swagger.io.

"Introduction to gRPC", online: https://grpc.io/docs/what-is-grpc/introduction/, Aug. 2021, accessed May 17, 2022, 3 pages, gRPC Authors.

"EvoMaster: A Tool for Automatically Generating System-Level Test Cases", online: https://github.com/EMResearch/EvoMaster, accessed May 17, 2022, 7 pages, GitHub.

Arcuri, Andrea, "EvoMaster: Evolutionary Multi-context Automated System Test Generation", online: https://arxiv.org/pdf/1901.04472.pdf, Jan. 2019, accessed May 17, 2022, 4 pages, arXiv.org.

"Java Pet Store", online: https://www.oracle.com/java/technologies/petstore-v1312.html, Demo 1.31_02, accessed May 17, 2022, 3 pages, Oracle.

International Search Report and Written Opinion for International Application No. PCT/US2023/010072, mailed May 2, 2023, 9 Pages.

* cited by examiner

DETECTING BROKEN OBJECT LEVEL AND FUNCTION LEVEL AUTHORIZATION ISSUES WITH API SERVICES

RELATED APPLICATION

This application claims priority to U.S. Prov. Appl. Ser. No. 63/300,359, filed Jan. 18, 2022, entitled DETECTING BROKEN OBJECT LEVEL AND FUNCTION LEVEL AUTHORIZATION ISSUES WITH API SERVICES, by Bosch, et al., the contents of which are incorporated herein by reference.

TECHNICAL FIELD

The present disclosure relates generally to computer systems, and, more particularly, to detecting broken object level authorization (BOLA) and broken function level authorization (BFLA) issues with application programming interface (API) services.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, one of the key functions of any service with an application programming interface (API) and/or remote procedure call (RPC) interface is their ability to verify the authenticity of users calling and enforce access control over the objects that are managed by a service. Without these functions (authentication and authorization of data access of authenticated users), the data managed by a service is "at risk". Yet, while there exists many frameworks for quickly building and firing up API services, tools for properly coding authentication and authorization functionality in those service are absent. The result is that authentication and authorization code in API-based services is usually implemented in an ad-hoc fashion or even poorly implemented and that such a service with its API can be considered "vulnerable" from a security standpoint.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

New application programming interface (API) service implementations need to benefit from security-implementation aids, and existing applications need to have security assessments made and security fixes where necessary. According to one or more embodiments of the disclosure, a mechanism is introduced for finding Broken Object Level Authorization (BOLA) and Broken Function Level Authorization (BFLA) issues in any API service. BOLA/BFLA issues in API services can lead to serious security risks and data vulnerabilities for the caller and callee, and thus also for the enterprise using and hosting the API service.

The techniques herein also provide dynamically crafted application models, access control lists (ACLs), and authorization models (i.e., "application artifacts"), specifically for brown field deployments but also for green field deployments, which can be used to enforce a particular authorization handling for existing API services through their frameworks. The prime benefit is that well- and poorly implemented services can equally benefit from properly user/object/function authorization handling. As such, there is a unique balance between dynamic learning and run-time enforcement. That is, while applied here to API service authorization models, the techniques herein are equally applicable to other types of security vulnerabilities, such as, data security, and application behavior.

Specifically, in accordance with one particular embodiment herein, an illustrative method may comprise: monitoring, by a process, a behavior of an application between one or more client devices and an application programming interface service; establishing, by the process, an application model of objects and functions within the application based on the behavior; and determining, by the process, an authorization logic of the application for the objects and functions based on the application model. In one embodiment, the illustrative method further comprises: testing one or more authorization approaches against the application to determine one or more discrepancies within the authorization logic indicative of faulty authorizations; and mitigating the one or more discrepancies.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
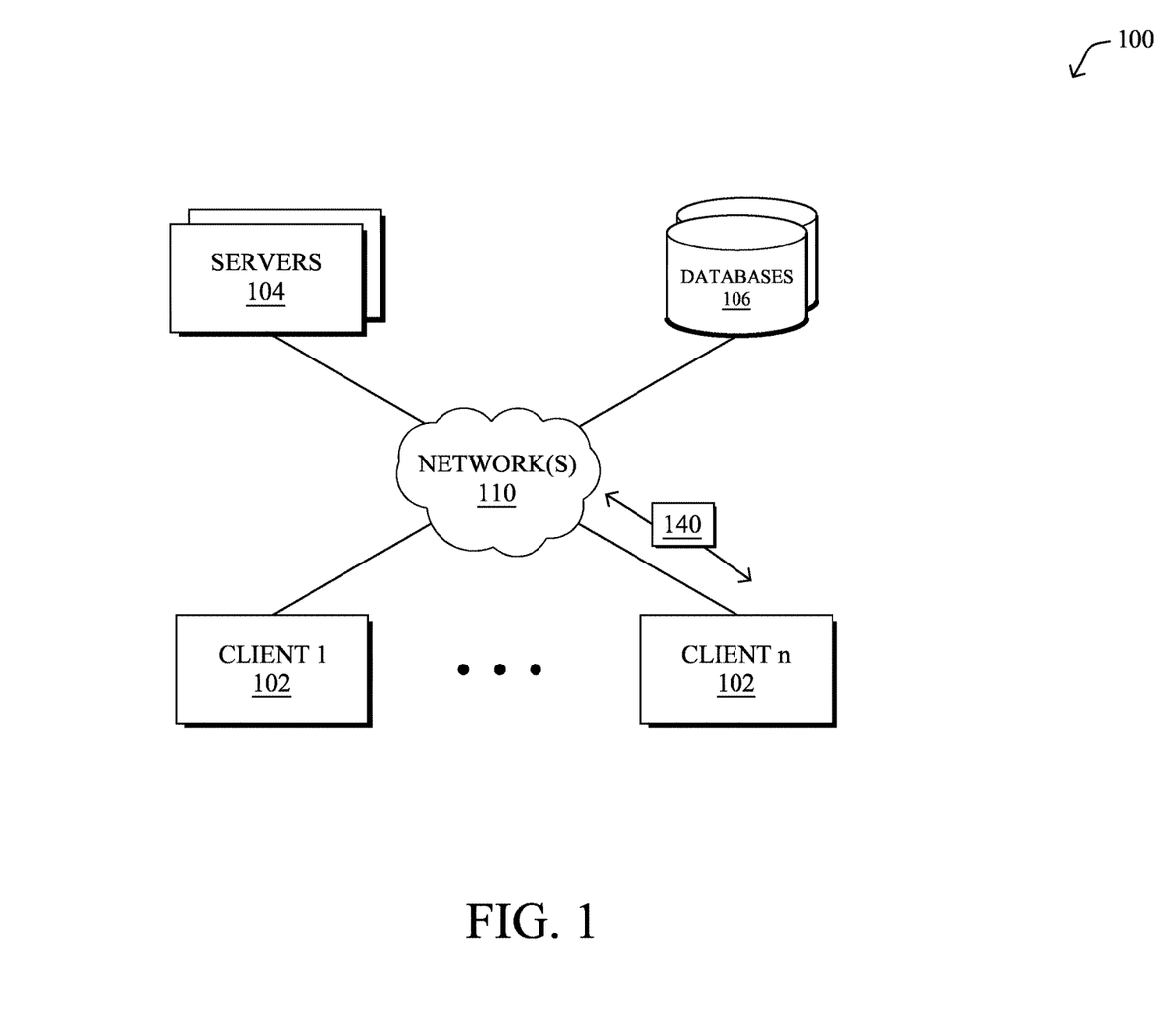
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
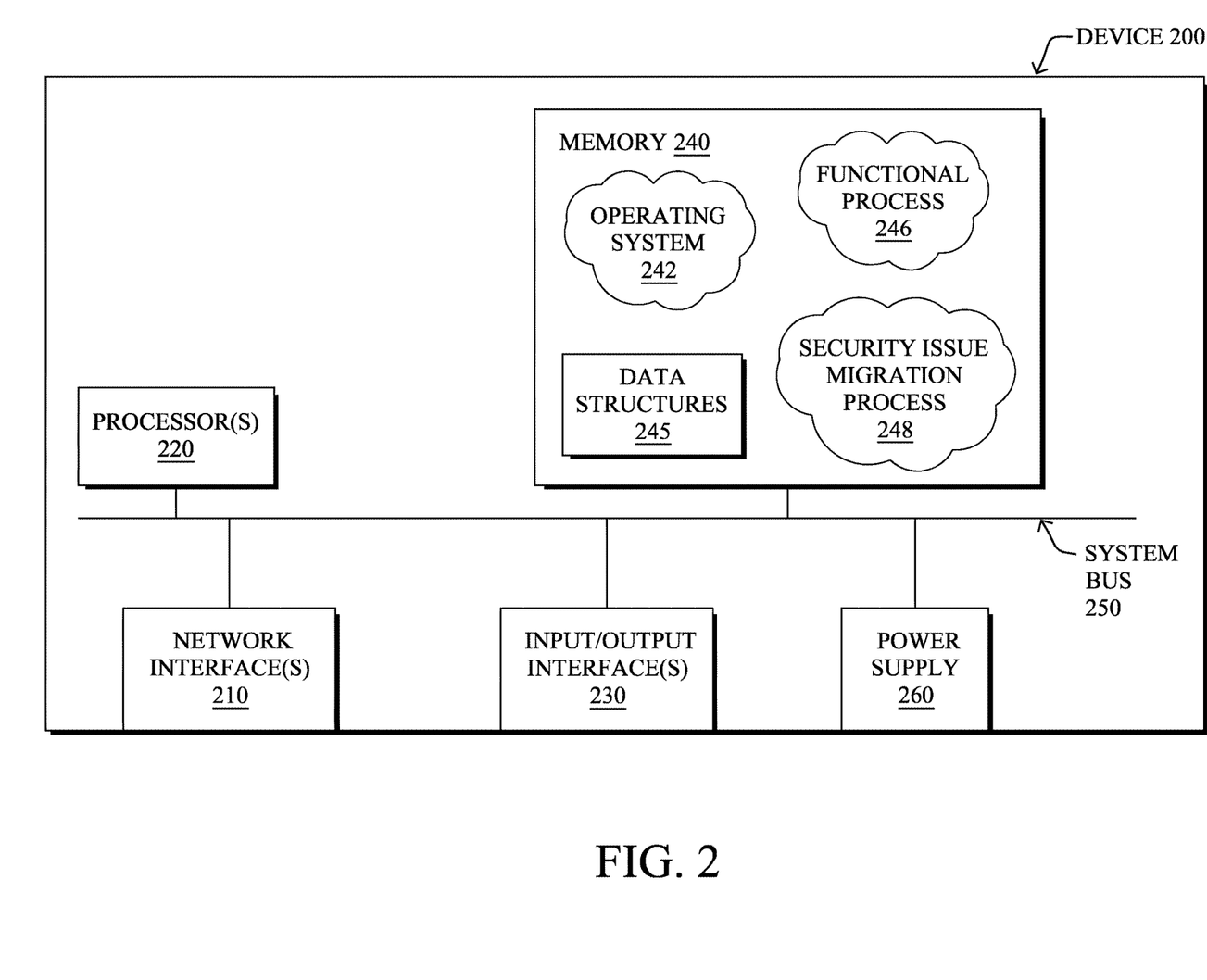
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "Security Issue Mitigation" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Detecting BOLA/BFLA Issues with API Services——

As noted above, API/RPC interfaces often need to verify the authenticity of users to enforce access control over managed objects. Otherwise, the data managed by a service is "at risk". However, as also noted above, tools for properly coding authentication and authorization functionality in those service are absent, resulting in such authentication and authorization code in API-based services being ad-hoc and/or poorly implemented, leaving such services in a security vulnerable state. Given that most newly written software follows the cloud-native, micro-service design pattern, well-formed and implemented API services are key to securing the new Internet of API services.

Broken Object Level Authorization (BOLA) and Broken Function Level Authorization (BFLA), in particular, are two key security issues and are listed in the Open Web Application Security Project® (OWASP) API top 10 security/vulnerability issues list for API services, and both pose serious security risks when deploying API services. BOLA cases are cases where unauthorized users can access restricted objects implemented by an API service, accessing objects managed by a service these users are not supposed to create, read, update and/or delete. BFLA cases are where unauthorized users can execute functions implemented by a service that they are not supposed to execute (e.g., management functions). An example of a BOLA case is a case where an authorized user gets access to bank account information this user is not supposed to have access to, e.g., by simply replacing their bank account number with someone else's. A BFLA case, on the other hand, can be a case where a management interface with access to all bank accounts can be used by a user who is not authorized to get access to that function.

Both BOLA and BFLA cases are symptoms of poorly implemented API services, e.g., by way of incorrect requirements setting for the developer to implement the API service, sloppy programming, or bit-rot/security-rot through continuous updates to API service code. For instance, BOLA cases often occur when the programmer incorrectly programmed object authorization code (if at all) for objects that are addressed; BFLA cases occur when the programmer does not verify if a particular user should be able to access and execute a method in a service.

One of the key difficulties in today's API service development is the absence of tooling to build and test for proper authentication of calling users and authorization of those users for data managed by the API service. Interface Definition Languages (IDLs) such as OpenAPI [OAS] and gRPC do not enable proper descriptions of the data that is being managed by these services; they only provide for an interface of the actual RPC service. Then, tools such as Flask and FastAPI do not help with the generation of proper authentication and authorization code either—again, with the absence of proper data modeling procedures in the IDLs, API service tools have little to go on to automatically craft such procedures. In other words: there is no concept of an "object" in modern IDLs, so with the absence of such, how can a designer of an API service or a developer of the API service even articulate access primitives for those objects? While OpenAPI does enable one to specify authorization tags (named: authentication/security tags) when using OAuth2.0 and associated (JWT) token handling, there is no rigor in formalizing these statements to allow for automated testing of the API services. In most other cases, OpenAPI/gRPC authorization simply relies on carrying specific tokens for accessing objects managed by a service. Only when using specific tags and/or tokens that are related to specific objects (e.g., a user's bank account number) can proper access control be enforced. Unfortunately, in addition to not describing objects, popular IDL supports thus also do not describe access control lists (ACLs) for such API services today.

A series of manual tests can be conducted to assess the quality of the software system, but such manual tests are often non-comprehensive. Additionally, given the absence of proper object definitions, automatic security testing of API services, generally, is difficult. If all the testing code must go on is a specification of the interface of a service, that even lacks proper object modeling functions, it is neigh impossible to understand what constitutes an authorization security gap and what not. For instance, a bank's API service may list an interface to obtain the value of a bank account. If two distinct users obtain this information, is this a security gap or not? To further complicate understanding if a service has security issues, often the OpenAPI specification itself is absent for API services—in most cases only a Software Development Kit (SDK), i.e., library and a man-page for the library is available; not the actual specification of the API service itself, which makes automated testing even more daunting. Accordingly, the security software cannot attest to the quality of the service generally, and no security department can take action against poorly implemented services.

The techniques herein, therefore, provide a simple mechanism to security test API services for data and function authorization vulnerabilities (i.e., BOLA and/or BFLA issues). To do this, the techniques herein provide a mechanism that integrates the developer and/or security tester in dynamically building the object, authentication, and authorization model of a service. As described in greater detail below, the techniques herein generally comprise the following steps:

(a) trace regular client/server traffic and build up the IDL specification with the help of the developer/tester;

(b) (semi-)automatically identify objects carried in those traces and, with the help of the developer/tester identify which API methods manage what objects and what credentials are needed for those operations—and create an abstract application service model of the tested service;

(c) enable the developer/tester to synthesize service accounts for testing purposes and iteratively and (semi-)automatically, using fuzzing methods, extend, correct and amend the application service model by subjecting the API service to a series of templated tests; and (d) show to the developer/tester the actual API service object, authentication, and authorization model—i.e., the application model.

Steps (a)-(d) can be performed repetitively to improve the application model over time. The developer/tester can then identify potential BOLA/BFLA issues in API services by reviewing the dynamic application model.

Said differently, the embodiments herein present a method to provide partially automated security testing of API services, combining dynamic tracing of the service, with developers and/or security testers guiding (semi-)automatic analysis of the traces of the API service specifications to form an application model, which includes access control lists and a CRUD model for the objects managed by the service. Then, these models are used for specific object and functions authorization testing to show the developer/tester what alternate access to objects and functions are available and, thus, assess the quality of the API service.

Ideally the application, object, authentication, and authorization model for API services are well known and defined before an API service is deployed (="green field" deployments)—i.e., the application model should be defined before the service is deployed and defined while the code is written. In such cases, a formalized version of this model can be used by extensions in popular API frameworks for automatically enforcing the authorization rules and thus for proper authorization handling in API services. Unfortunately, these definitions, today, almost universally do not exist. With the dynamically crafted application model in hand above, the techniques herein can feed those models directly into popular API framework extensions to create rules for such "brown field" deployments (where the API services have been poorly implemented), as well, in order to automatically enforce proper authorization. According to the techniques herein, therefore, in cases where application models exist ("green field deployments") the frameworks simply use the models, and for those cases where they do not exist ("brownfield deployments"), the techniques herein can dynamically create the application models.

Moreover, by making modeling a continuous process, drift in specifications, which is a potential security gap, can be detected and mitigated. That is, with the continuous development of API services, application models should adapt as well. Yet, it is unlikely that this will be done as rigorously as updating the application code itself. By dynamically keeping track of the application model and its drift, the techniques herein can get a measure for its vulnerabilities over time and automatically protect the service by "RASP"ing the API service implementation through the provided extensions herein.

Figure 3A:
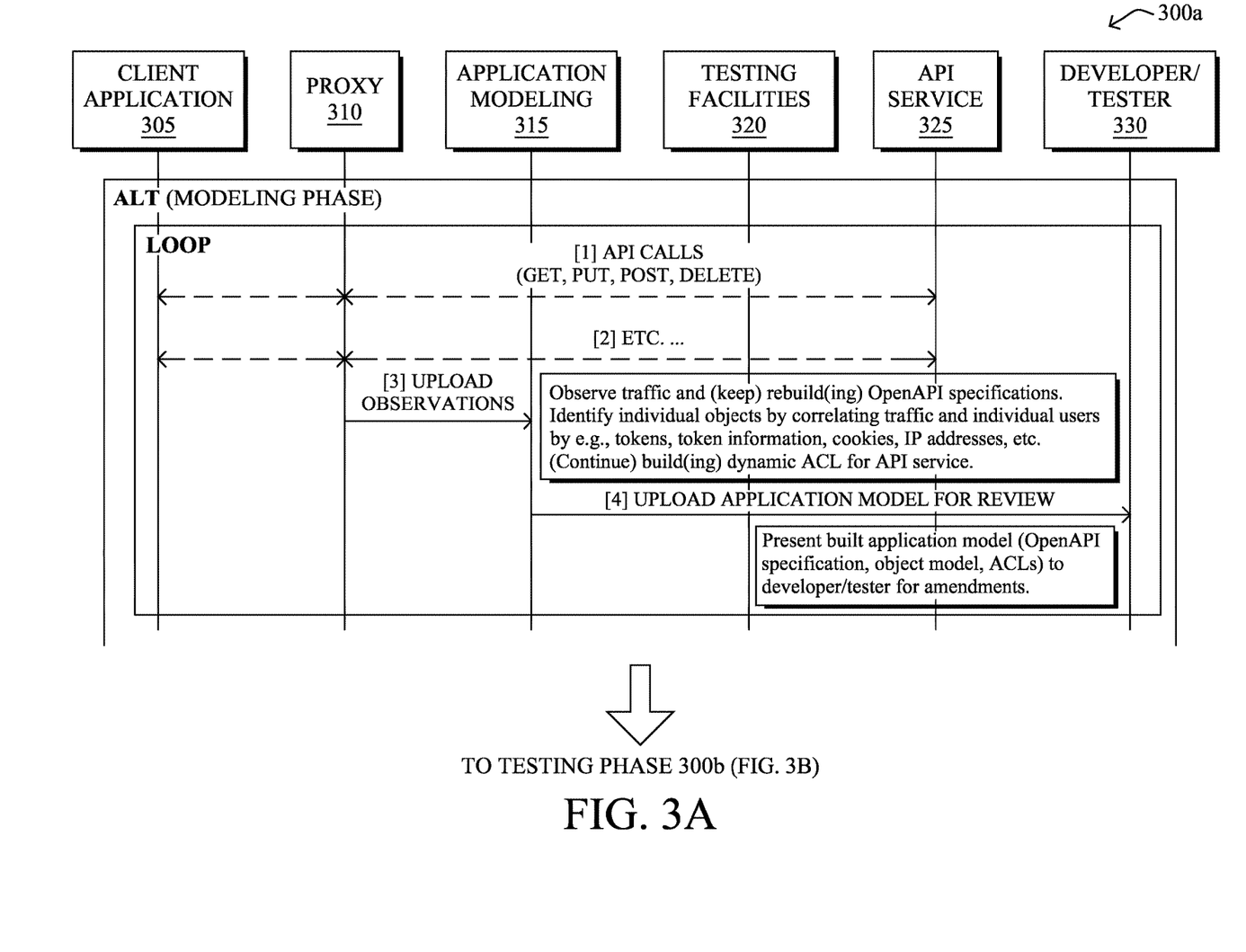
FIGS. 3A-3B illustrate an example basic call flow for generalized Broken Object Level Authorization (BOLA) and Broken Function Level Authorization (BFLA) testing for application programming interface (API) services in accordance with one or more embodiments described herein.
Figure 3B:
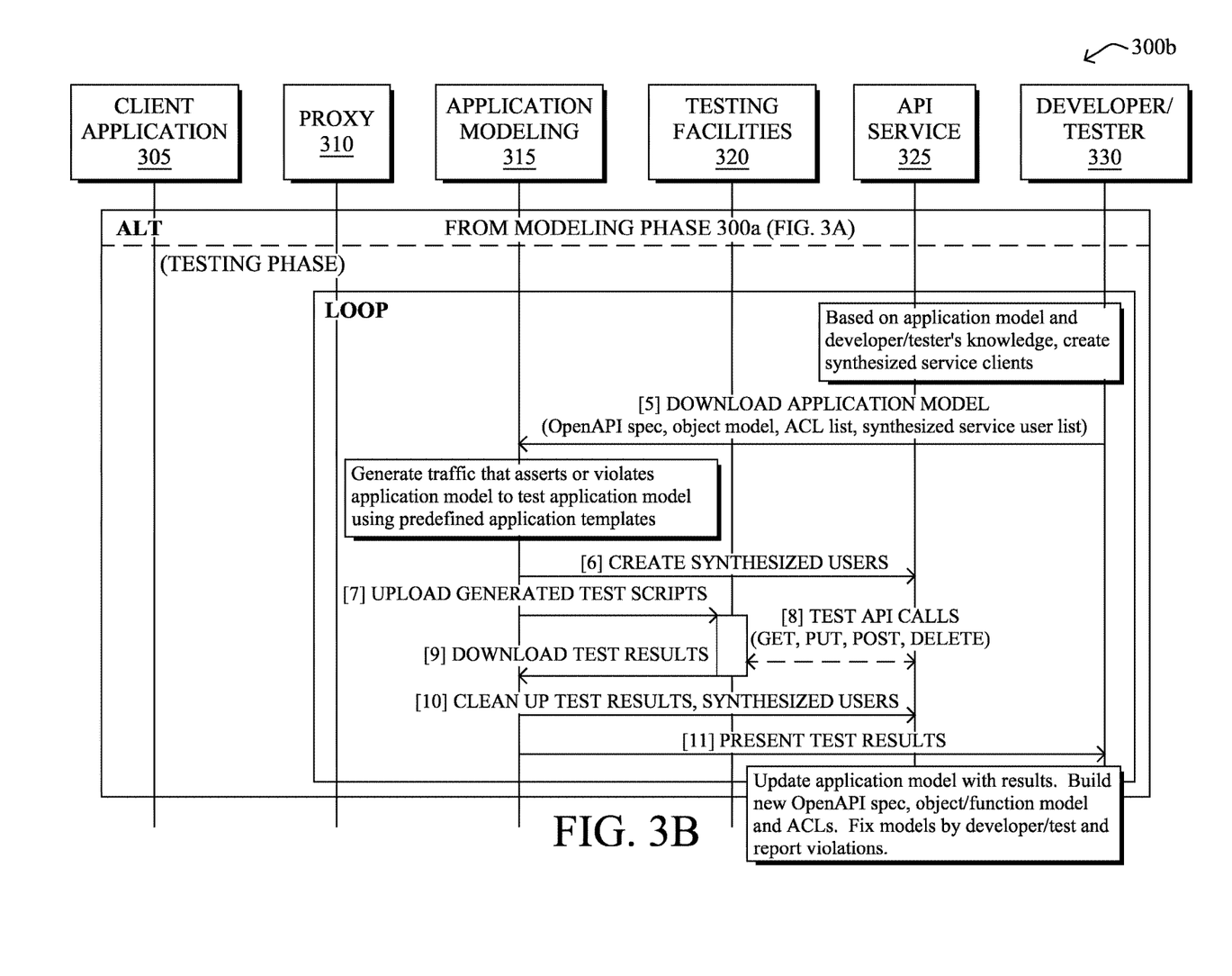

FIGS. 3A-3B illustrate an example basic call flow 300*a-b* for generalized BOLA/BFLA testing for API services, showing the message and operational flow of the techniques herein, namely as a "modeling phase" 300*a* in FIG. 3A, and a subsequent "testing phase" 300*b* in FIG. 3B. Note that there are several illustrative actors in the methods herein:

- A client application 305 that interacts with a service. The techniques herein integrate with the client to learn of the basic behavior of an API service.
- A proxy service 310 to capture traffic between clients and API services. This serves to learn of traffic: all traffic is intercepted and used to recreate OpenAPI specifications based on client/server traffic, and by assessing identifiers used in the operations, which API methods create objects, and which other API methods refer to those objects. Additionally, it ties the actual user to the operations by observing tokens, IP addresses or any other principal identifying information.
- Application modeling 315 that creates a set of documents that reflect the operations of the API service, including the OpenAPI specification itself, a create, read, update, and delete (CRUD) model of the application and an ACL model that goes with the service. The techniques herein refer to this as the "application model".
- Application testing facilities 320 to execute a series of tests on the service to further application modeling. Its task is to drive tests given synthesized application models using synthetic user service accounts to further improve the application model.
- The API service 325 is the service under test. It is the subject of the application modeling.
- The developer/tester 330 is a person and/or process responsible for amending synthesized application models.

Operationally, the techniques herein begin with tracing of traffic to understand the application and its interface. As stated before, often an IDL specification of an API service is absent. Thus, to understand how to interact with an API service, the first step of testing API services involves understanding its API. For this, the techniques herein insert a man-in-the-middle (=proxy) between clients and servers to intercept all traffic and to dynamically rebuild the API specification of the API service. This can be done by, e.g., Istio/Envoy, an API gateway, or any other man-in-the-middle technology. An example of a client can be an application hosted on a mobile device operated by a user, or a container application calling upon another container application. Care needs to be taken to intercept and decipher and re-encrypt TLS traffic, but techniques exist to address this. It is understood that at best, only those API methods that are used can be modelled.

The various steps of intercepting traffic are reflected in the modeling phase 300*a* of FIG. 3A by messages [1] and [2]. Namely, the client application 305 sends API calls (e.g., GET, PUT, POST, DELETE) to API service 325, via proxy service 310, as messages [1] and [2]. Then, the proxy service 310 uploads the learnt information/observations to application modeling 315 in message/step [3].

The key to modeling user interactions is identifying what constitutes individual users. For this, used tokens, cookie tracking, authorization bits and even individual IP addressed can be used. By tracking those identifiers, and associating these with individual HTTP requests, a map be built up which "users" are accessing what API methods with what messages.

Next, it is important to cross-correlate messages to synthesize "objects" from the messages. Message parameters are correlated in the stream of messages and first occurrences of object references are identified. The first occurrence of an object reference is likely the result of a "create" operation, and subsequent operations are likely read, update, and delete operations. HTTP REST, for example, is specifically lax about Creating, Reading, Updating, and Deleting (CRUD) "objects", so it is important to use the data for crafting a CRUD model. Note that these operations are non-exact, and that developer/tester feedback is required to affirm and amend if the system modeled out the objects incorrectly. Note that an object ID not necessarily needs to be a UUID. A city name like "Amsterdam" can be just as much an object ID as a string like 123e4567-e89b-12d3-a456-426614174000. Also note that the system may classify a parameter as an object whereas it was not even an object. Message [4] in FIG. 3A shows the interaction with the developer/tester, where application modeling 315 uploads the application model for review to the developer/tester 330 (e.g., a user interface, a dashboard, an automated system, etc.).

As an example, the flow below shows an example how to build a CRUD model. It is an excerpt of a sequence of transactions with an illustrative "Petstore" software. Note that the example below is simple and that these flows can be extensively complex, and objects created can be created referring to other created objects. Yet, at the end of the day, most API services adhere to the CRUD model. (Note that not all API services can be (semi-)automatically modeled).

```
"request_method": "POST",
"request_url": "https://petstore3.swagger.io/api/v3/pet",
"request_data": "{\n \"id\": 198772,\n \"name\": \"doggie\",\n \"category\":
{\n \"id\": 1,\n \"name\": \"Dogs\"\n },\n \"photoUrls\": [\n \"string\"\n ],
\n \"tags\": [\n {\n \"id\": 0,\n \"name\": \"string\"\n }\n ],\n \"status\":
\"available\"\n}", "response_code": 200,
"response _body":
"{\"id\":198772,\"category\":{\"id\":1,\"name\":\"Dogs\"}\"name\":
\"doggie\",\"photoUrls\":[\"string\"],\"tags\":[{\"id\":0,\"name\":
\"string\"}],\"status\":\"available\"}"
"request_method": "GET",
"request_url": "https://petstore3.swagger.io/api/v3/pet/l98772",
"request_data": null,
"response_code": 200,
" response_body":
"{\"id\":198772,\"category\":{\"id\":1,\"name\":\"Dogs\"},\"name\":
\"doggie\",\"photoUrls\":[\"string\"],\"tags\"[{\"id\":0,\"name\":\"string\"}],
\"status\":\"available\"}"
"request_method": "POST",
"request_url": "https://petstore3.swagger.io/api/v3/store/order",
"request_postdata": "{\n\"id\": 10,\n\"petId\": 198772,\n\"quantity\":
7,\n\"shipDate\":\"2022-01-06T12:08:47.854Z\",\n \"status\":
\"approved\",\n \"complete\": true\n}",
"response_code": 200,
"response _body":
"{\"id\":10,\"petId\":198772\"quantity\":7\"shipDate\":\"2022-01-
06T12:08:47.854+00:00\"\"status\":\"approved\",\"complete\":true}
"request_method": "GET",
"request_url": "https://petstore3.swagger.io/api/v3/store/order/10",
"request_data": null,
"response_code": 200,
" response _body":
"{\"id\":10,\"petId\":198772,\"quantity\":7,\"shipDate\":\"2022-01-
07T11:29:02.714+00:00\",\"status\":\"approved\",\"complete\":true}"
"request_method": "DELETE",
"request_url": "https://petstore3.swagger.io/api/v3/store/order/10",
"request_postdata": null,
"response_code": 200,
"response_body": ""
"request_method": "DELETE",
"request_url": "https://petstore3.swagger.io/api/v3/pet/198772",
"request_data": null,
"response_code": 200,
"response_body": "Pet deleted"
```

The example above shows the creation of a pet in the petstore and a customer ordering a particular pet. A CRUD model can be extracted from the sequence straightforwardly. In the sequence two identities can be considered objects: the numbers "10" and "198772". When combined with the OpenAPI specification for this service, and with the developer/tester's help, this sequence can lead to a CRUD model for pets can be construed as follows:

C: POST https://petstore3.swagger.io/api/v3/pet, body Y_id
    R: GET https://petstore3.swagger.io/api/v3/pet/[Y_id]
    U: PUT https://petstore3.swagger.io/api/v3/pet/[Y_id]
    D: DELETE https://petstore3.swagger.io/api/v3/pet/[Y_id]
Followed by
    C: POST https://petstore3.swagger.io/api/v3/store/order body: X_id, Y_id
    R: GET https://petstore3.swagger.io/api/v3/store/order/[X_id]
    D: DELETE https://petstore3.swagger.io/api/v3/store/order/[X_id]

The above model shows the relationships between the objects, and how to create update, read and delete the objects. While it is easy to disambiguate the store and pet identities when they are using distinct values, as in the example, there is no such guarantee. If, by this example, a pet and an order both get identity "10", automatic disentanglement is complex. Hence, care needs to be taken to unravel the flows into their individual CRUD sequences and the developer/tester's help is needed to perform this disentanglement. Also, given that some objects exist that refer to other objects implies a certain application semantics (e.g., one should not be able to DELETE a pet while it is kept inside an order). Determining such semantics mostly cannot be performed automatically, the developer/tester's help is needed to articulate such assertions in the object model:

If Y_id is part of an object referred to by X_id, it cannot be DELETEd Once object and object identifiers have been identified, they can be associated with users by way of the traces. Some objects will be addressed by individual users, some by more than a single user. This is then presented again to the developer/tester who can affirm and/or amend the sharing model of these objects in the form of an Access Control List (ACL)—below presented as an assertion list. At this point the developer/tester can already identify potential security vulnerabilities if access to functions is observed that should not be allowed for a certain set of users and when access to non-shareable objects is identified. For example:

An X_id cannot be shared and is read-writeable by the creator of the object
    A Y_id is readable by all and is read-writeable by the creator of the object
    A Z_id is only accessible by user "Management" as asserted in the JWT token field "user-type"

While ideally the assertion list is automatically generated, this is quite difficult—the authorization logic in the software implementation can be arbitrary complex, depending on external databases (say: LDAP), or even be dependent on say, time of day. Thus: at best the techniques herein attempt to create rules that can be always asserted. A practical example of this may be the following assertions:

```
- User "aduminuc" with credentials "xxx, yyy":
    ○ Can:
        ■ Create Pet
        ■ Modify the above pet
        ■ Read the above pet
    ○ Cannot:
        ■ Delete above pet
- User "pbosch" with credentials "zzz, ttt":
    ○ Can:
        ■ Read the pet created by aduminuc
        ■ List existing pets in shop xyz
    ○ Cannot:
        ■ Do anything else.
```

With a recreated API specification, CRUD model, user list and ACL/assertion lists for the managed objects, an application model of the API service is thus created. This application model forms the basis to assessing if the API service suffers from additional BOLA and/or BFLA issues. All additional clauses that are developer/tester changeable are additional assertions on the objects managed by the service(s).

According to one or more embodiments herein, the techniques herein also then "fuzz" the service to test the application service model. That is, and with reference now to testing phase 300b of FIG. 3B, to fully assess BOLA/BFLA issues with the crafted application service model, access to objects managed by the API service and API methods themselves for individual users needs to be tested. For this, the techniques herein define a set of synthesized "test" users akin to the methods described in project EVO Master and this paper. These test users are equivalent to real users and are provided with the appropriate credentials to exercise the API interface by performing Remote Procedure Calls (RPCs) with synthesized data.

The reason the techniques herein craft a CRUD model before any of the tests can be executed is to understand how to interact with the service through template-driven applications. With the CRUD model in hand, abstract applications can be written that create, read, update, and delete objects and/or sub-objects for specific users. The reason this is important is this then enables automatic BFLA and BOLA testing on any service. An example of such an abstract application can be:

Simple object management (A, A(Y), A(U)):
    Determine if sub-objects for object Y need to be present and if so, create those first
    Create object Y for user U
    Read the object Y for user U
    Update the object Y for user U
    Delete the object Y for user U
    If sub-objects were created, delete those sub-objects Here A(svc) represents the application mode, Y the object that needs to be tested in the service A and U the specific user for which this needs to be tested. This user U is a synthetic service user specifically created for testing.

To cite the BFLA example, the techniques herein need to create, read, update, and delete operations to understand which (synthesized) users can access and execute functions in the API service. By using the synthesized CRUD model in combination with the set of templated programs, the techniques herein can exercise and test all operations. The techniques herein start by creating, reading, updating, and deleting objects. Given that some objects may be dependent on other objects, creating an object may lead to the creation of other objects, all given the assertions as defined in the modeling phase. To make sure the techniques herein cover all cases, the techniques herein cycle through all users. This gives the techniques herein a complete overview which user can access what function in the actual API service.

If a formal OpenAPI specification is available, the access results are correlated with the OpenAPI specification authorization model. Discrepancies here point directly at BFLA issues—a discrepancy, for instance, is when a particular method should only be accessible to an "administrator" and when a synthesized regular user can access the function, the API service did not verify authenticity of the user.

In cases where the OpenAPI specification is absent, the proper function authorization clauses are likely absent. In this case, the canvassed results are presented to the developer/tester, and they can update the function authorization model of the API service and update the synthesized OpenAPI specification. Again, discrepancies after these updates can signal BFLA issues to the tester.

As shown in testing phase 300b of FIG. 3B, message [5] shows the downloading of all application model (e.g., OpenAPI spec, object model, ACL list, synthesized service user list, etc.) into the application modeling phase (to generate traffic that asserts or violates application model to test application model using predefined application templates). Message [6] then shows the creation of synthesized users on the system under test at API service 325. Message [7] shows how the testing tools are primed with the appropriate tests, uploading generated test scripts from the application model 315 to the testing facilities 320. Message [8] then shows the actual testing (between testing facilities 320 and API service 325), whereas message [9] shows that the test results are made available for downloading to the application modeling phase. When testing completes, the system under test needs to be cleaned up and all testing state must be removed—this happens in message [10]. Presenting the results to the developer/tester is initiated by message [11], where the application model may be updated with the results (e.g., building new specs, models, ACLs, etc., and or reporting any violations, accordingly).

To make sure many if not all code paths are exercised to test for BFLA issues, "fuzzing" techniques may be used to augment input parameters, even for and especially for invalid input as often authorization code is not reached at all.

A separate set of tests can be established for detecting BOLA issues in selected API services. In the modeling phase, a set of sharing assertions (i.e., ACLs) have been created with the help of the developer/tester. Akin to testing for BFLA issues, here, with the synthesized CRUD, user, and object model, the techniques herein create objects in the API service that are supposed to be non-shareable, non-readable, non-updateable, or non-delete-able given the identity of the user, the user that created the object, or any other assertions on the object model. Again, the techniques herein craft templated programs using the assertions where, for example, user A creates an object, the techniques herein switch to user B by updating the credentials and then try to read, update and/or delete the object. The BOLA testing model can be made more elaborate by crafting a wide range of templates.

Z=Select objects from A with shareability assertions
ACL-based object management (A, Z, A(U1), A(U2)):
    Determine if sub-objects for object Y need to be present and if so, create those first
    Create object Y for user U1
    Read the object Y for user U1
    Err=Update the object Y for user U2
    Assert Err
    Err=Delete the object Y for user U2
    Assert Err
    If sub-objects were created, delete those sub-objects The example above shows a simple templated case where during the management of an object, the techniques herein switch synthesized user. It is expected that the service to return errors. When it does not, the techniques herein found a BOLA issue. Again, users U1 and U2 are synthetic users only to test the assertions.

(Notably, the same CRUD model can be used to test additional API service programming issues such as deleting objects multiple times.)

According to one or more embodiments herein, the techniques herein use application modeling for automatically enforcing authorizations. That is, thus far, the techniques herein described mechanisms to learn of application models with all their artifacts. This learning leads to a set of documents that can be associated with the API service. Such documents are likely JSON or YAML files that can accompany the OpenAPI specification itself.

If application models are available when the service starts, these models can be consumed by popular API frameworks. Flask and FastAPI are two of such frameworks. When consumed, such frameworks can automatically infer the use of API methods, and make sure a specific authorization model is enforced: the CRUD model and associated assertions help such frameworks do that enforcement. In other words: what was dynamically learnt and amended by developers/testers can be directly integrated as an enforcement mechanism in those API services.

Automatic integration of API service authorization functionality into the frameworks enable security personas to better control and secure API services.

Figure 4:
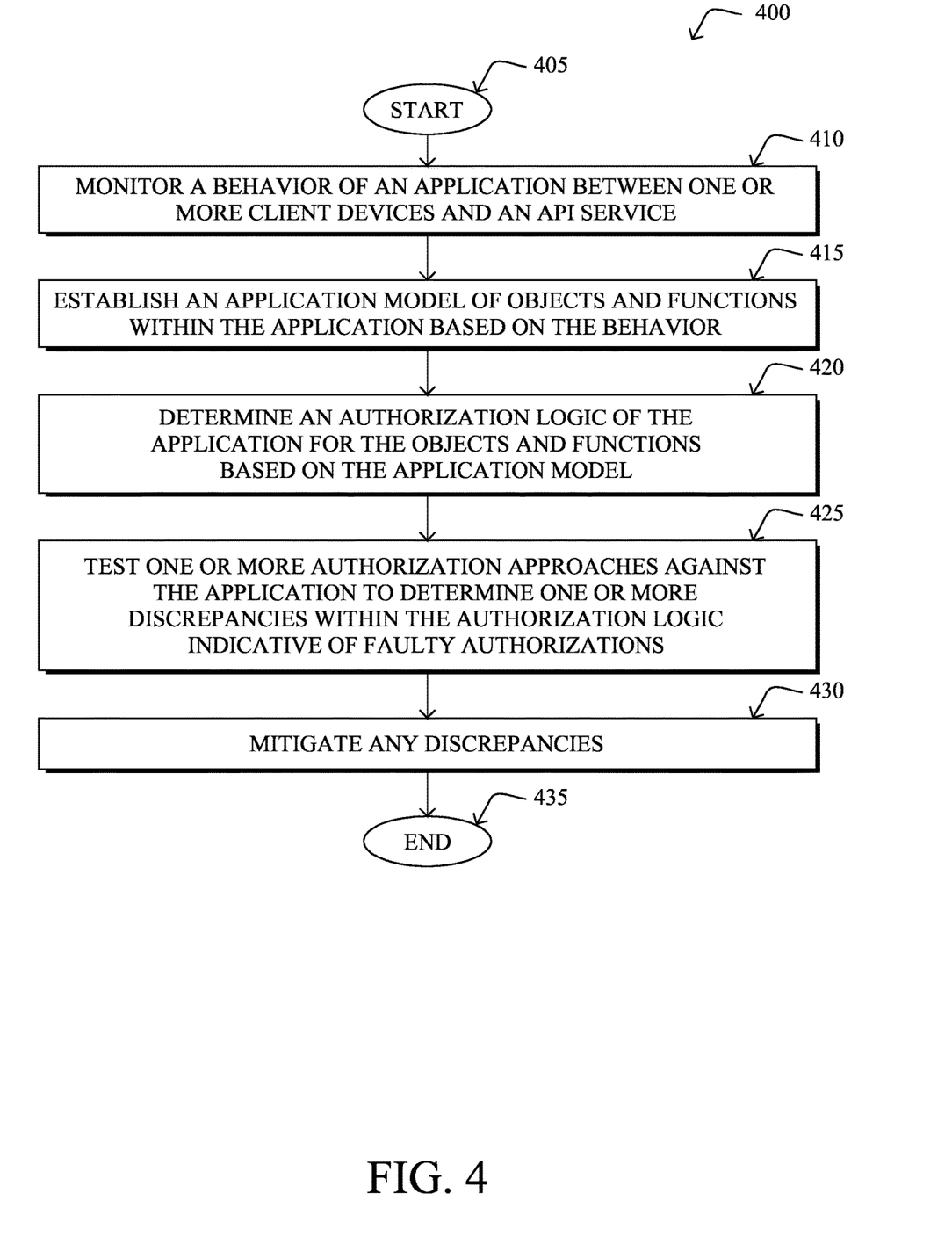
FIG. 4 illustrates an example simplified procedure for detecting BOLA and BFLA issues with API services in accordance with one or more embodiments described herein.

In closing, FIG. 4 illustrates an example simplified procedure 400 for detecting BOLA and BFLA issues with API services in accordance with one or more embodiments described herein. For example, a non-generic, specifically configured device (e.g., device 200) may perform procedure 400 by executing stored instructions (e.g., process 248). The procedure 400 may start at step 405, and continues to step 410, where, as described in greater detail above, the process monitors a behavior of an application between one or more client devices and an API service. As mentioned above, monitoring the behavior of the application may be based on a plurality of messages consisting of one or both of intercepted client calls and generated synthetic traffic, to allow cross-correlating the plurality of messages to synthesize one or more objects from the plurality of messages and assumed functions of the one or more objects (e.g., create CRUD operations). As also noted above, monitoring may comprise identifying individual users for individual HTTP requests between the one or more client devices and the API service (e.g., via tokens, cookie tracking, authorization bits, individual IP addresses, etc.).

In step 415, the process establishes an application model of objects and functions within the application based on the behavior, and in step 420 determines an authorization logic of the application for the objects and functions based on the application model, as described in greater detail above.

In step 425, the process may then test one or more authorization approaches against the application to determine one or more discrepancies (e.g., due to BOLA/BFLA) within the authorization logic indicative of faulty authorizations. In the event of any such discrepancies, in step 430 the process may mitigate such discrepancies, such as by presenting them to a developer interface, automatically creating an enforcement mechanism to prevent the discrepancies, and so on.

The illustrative simplified procedure 400 may then end in step 435. Other steps may also be included generally within procedure 400, e.g., as separate steps and/or as additions to steps already specifically illustrated above.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for detecting BOLA/BFLA issues with API services. In particular, the techniques herein not only detect, but mitigate, through dynamic enforcement of created security policies, reporting of issues, and so on. Note that while previous techniques may scan an API for vulnerabilities, they have been based on having access to the API specification/documentation in order to attempt to bypass authentication at various locations in the API specification. The techniques herein, on the other hand, provide behavior-based determination of authorization logic from learned application models, and also the subsequent testing of that authorization logic. That is, the techniques herein do not need access to the API specification, and can assess its behavior by watching client interactions, and then by testing the learned model to find BOLA/BFLA vulnerabilities, specifically.

Illustratively, the techniques described herein may be performed by hardware, software, and/or firmware, such as in accordance with the illustrative security issue mitigation process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: monitoring, by a process, a behavior of an application between one or more client devices and an application programming interface service; establishing, by the process, an application model of objects and functions within the application based on the behavior; and determining, by the process, an authorization logic of the application for the objects and functions based on the application model. In one embodiment, the method further comprises: testing one or more authorization approaches against the application to determine one or more discrepancies within the authorization logic indicative of faulty authorizations; and mitigating the one or more discrepancies.

In one embodiment, the one or more discrepancies within the authorization logic indicative of faulty authorizations are due to Broken Object Level Authorization and/or Broken Function Level Authorization.

In one embodiment, mitigating comprises: presenting the one or more discrepancies to a developer interface.

In one embodiment, mitigating comprises: automatically creating an enforcement mechanism to prevent the one or more discrepancies.

In one embodiment, monitoring the behavior of the application is based on a plurality of messages consisting of one or both of intercepted client calls and generated synthetic traffic. In one embodiment, the method comprises: cross-correlating the plurality of messages to synthesize one or more objects from the plurality of messages and assumed functions of the one or more objects. In one embodiment, assumed functions are selected from a group consisting of: create operations; read operations; update operations; and delete operations.

In one embodiment, monitoring the behavior of the application comprises: identifying individual users for individual hypertext transfer protocol requests between the one or more client devices and the application programming interface service. In one embodiment, identifying individual users is based on or more of: tokens, cookie tracking, authorization bits, and individual internet protocol addresses.

In one embodiment, the application comprises client application software hosted on one or more entities selected from a group consisting of: client devices; micro-services; and virtual machines.

According to the embodiments herein, an illustrative tangible, non-transitory, computer-readable medium herein may have computer-executable instructions stored thereon that, when executed by a processor on a computer, may cause the computer to perform a method comprising: monitoring a behavior of an application between one or more client devices and an application programming interface service; establishing an application model of objects and functions within the application based on the behavior; and determining an authorization logic of the application for the objects and functions based on the application model. In one embodiment, the method further comprises: testing one or more authorization approaches against the application to determine one or more discrepancies within the authorization logic indicative of faulty authorizations; and mitigating the one or more discrepancies.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: monitor a behavior of an application between one or more client devices and an application programming interface service; establish an application model of objects and functions within the application based on the behavior; and determine an authorization logic of the application for the objects and functions based on the application model. In one embodiment, the process, when executed, is further configured to: test one or more authorization approaches against the application to determine one or more discrepancies within the authorization logic indicative of faulty authorizations; and mitigate the one or more discrepancies.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    monitoring, by a process, a behavior of an application between one or more client devices and an application programming interface service based on a plurality of messages consisting of generated synthetic traffic;
    establishing, by the process, an application model of objects and functions within the application based on the behavior, the application model including at least an API specification and a create, read, update, and delete (CRUD) model of the application;
    determining, by the process, an authorization logic of the application for the objects and functions based on the application model;
    testing, by the process, one or more authorization approaches against the application to determine one or more discrepancies within the authorization logic that are indicative of faulty authorizations, wherein the one or more discrepancies within the authorization logic indicative of faulty authorizations are due to Broken Object Level Authorization and/or Broken Function Level Authorization; and
    mitigating, by the process, the one or more discrepancies within the authorization logic.

2. The method as in claim 1, wherein mitigating comprises:
    presenting the one or more discrepancies to a developer interface.

3. The method as in claim 1, wherein mitigating comprises:
   automatically creating an enforcement mechanism to prevent the one or more discrepancies.

4. The method as in claim 1, wherein the plurality of messages further consists of intercepted client calls.

5. The method as in claim 4, further comprising:
   cross-correlating the plurality of messages to synthesize one or more objects from the plurality of messages and assumed functions of the one or more objects.

6. The method as in claim 5, wherein assumed functions are selected from a group consisting of: create operations; read operations; update operations; and delete operations.

7. The method as in claim 1, wherein monitoring the behavior of the application comprises:
   identifying individual users for individual hypertext transfer protocol requests between the one or more client devices and the application programming interface service.

8. The method as in claim 7, wherein identifying individual users is based on one or more of: tokens, cookie tracking, authorization bits, and individual internet protocol addresses.

9. The method as in claim 1, wherein the application comprises client application software hosted on one or more entities selected from a group consisting of: client devices; micro-services; and virtual machines.

10. A tangible, non-transitory, computer-readable medium having computer-executable instructions stored thereon that, when executed by a processor on a computer, cause the computer to perform a method comprising:
   monitoring a behavior of an application between one or more client devices and an application programming interface service based on a plurality of messages consisting of generated synthetic traffic;
   establishing an application model of objects and functions within the application based on the behavior, the application model including at least an API specification and a create, read, update, and delete (CRUD) model of the application;
   determining an authorization logic of the application for the objects and functions based on the application model;
   testing one or more authorization approaches against the application to determine one or more discrepancies within the authorization logic that are indicative of faulty authorizations® wherein the one or more discrepancies within the authorization logic indicative of faulty authorizations are due to Broken Object Level Authorization and/or Broken Function Level Authorization; and
   mitigating the one or more discrepancies within the authorization logic.

11. The tangible, non-transitory, computer-readable medium as in claim 10, wherein mitigating comprises:
   presenting the one or more discrepancies to a developer interface.

12. The tangible, non-transitory, computer-readable medium as in claim 10, wherein mitigating comprises:
   automatically creating an enforcement mechanism to prevent the one or more discrepancies.

13. The tangible, non-transitory, computer-readable medium as in claim 10, wherein the plurality of messages further consists of intercepted client calls, and wherein the method further comprises:
   cross-correlating the plurality of messages to synthesize one or more objects from the plurality of messages and assumed functions of the one or more objects.

14. The tangible, non-transitory, computer-readable medium as in claim 10, wherein monitoring the behavior of the application comprises:
   identifying individual users for individual hypertext transfer protocol requests between the one or more client devices and the application programming interface service.

15. An apparatus, comprising:
   one or more network interfaces to communicate with a network;
   a processor coupled to the one or more network interfaces and configured to execute one or more processes; and
   a memory configured to store a process that is executable by the processor, the process, when executed, configured to:
      monitor a behavior of an application between one or more client devices and an application programming interface service based on a plurality of messages consisting of generated synthetic traffic;
      establish an application model of objects and functions within the application based on the behavior, the application model including at least an API specification and a create, read, update, and delete (CRUD) model of the application;
      determine an authorization logic of the application for the objects and functions based on the application model;
      test one or more authorization approaches against the application to determine one or more discrepancies within the authorization logic that are indicative of faulty authorizations, wherein the one or more discrepancies within the authorization logic indicative of faulty authorizations are due to Broken Object Level Authorization and/or Broken Function Level Authorization; and
      mitigate the one or more discrepancies within the authorization logic.

* * * * *